United States Patent [19]

Abbondanti

[11] Patent Number: 4,713,743

[45] Date of Patent: Dec. 15, 1987

[54] LOAD-COMMUTATED INVERTER AND SYNCHRONOUS MOTOR DRIVE EMBODYING THE SAME

[75] Inventor: Alberto Abbondanti, Penn Hills Township, Allegheny County, Pa.

[73] Assignee: Westinghouse Electric Corp., Pittsburgh, Pa.

[21] Appl. No.: 11,969

[22] Filed: Feb. 6, 1987

[51] Int. Cl.[4] .......................................... H02M 7/521
[52] U.S. Cl. ...................................... 363/138; 363/96; 323/210
[58] Field of Search ................... 363/37, 96, 135, 136, 363/137, 138; 323/207, 205, 209, 210

[56] References Cited

U.S. PATENT DOCUMENTS

| | | | |
|---|---|---|---|
| 4,131,937 | 12/1978 | Pelly et al. ............................ | 363/96 |
| 4,306,283 | 12/1981 | Kiwaki et al. ................... | 323/210 X |
| 4,517,636 | 5/1985 | Uchino et al. ...................... | 363/138 |

OTHER PUBLICATIONS

Laithwaite, "Natural Commutation of Current-source Thyristor Inverters, Sep.–Oct. 1980, pp. 897–902.
Rosa, "Utilization and Rating of Machine Commutated Inverter-Synchronous Motor Drive", IEEE vol. IA-15, pp. 155–164.
Le-Huy et al., "A Self-Controlled Synchronous Motor Drive Using Terminal Voltage Sensing", IEEE 1986, pp. 562–569.
Plunkett et al., "System Design Method for a Load-Commutated Inverter-Synchronous Motor Drive", IEEE vol. IA-20, May–Jun. 1984, pp. 589–597.
Steigerwald et al., "Analysis of a Novel Forced-Commutation Starting Scheme for a Load-Commutated Synchronous Motor Drive", IEEE vol. IA-15, Jan.-Feb. 1979, pp. 14–24.

*Primary Examiner*—Patrick R. Salce
*Assistant Examiner*—Kristine Peckman
*Attorney, Agent, or Firm*—C. M. Lorin

[57] ABSTRACT

In a load commutated inverter system, the recovery time of the outgoing static switch is extended by applying an auxiliary commutation voltage in series with the associated phase line. This action is triggered in response to the gating signal of the on-coming switch during a time interval initiated before the expiration of the overlap time interval. Its duration extends by a predetermined amount beyond the normal recovery time of the outgoing switch.

13 Claims, 15 Drawing Figures

LOAD-COMMUTATED INVERTER AND SYNCHRONOUS MOTOR DRIVE EMBODYING THE SAME

BACKGROUND OF THE INVENTION

The invention relates to load-commutated inverters in general, and more particularly to a synchronous motor drive embodying such inverter.

In a load-commutated inverter (LCI), the load supplies the means of commutation of the SCR devices of the inverter. This is achieved provided there is a leading phase displacement angle for the inverter output current with respect to the load voltage. When the load is a synchronous motor, a leading power factor can be achieved. However, the need for running the motor with a leading current displacement angle and the resulting lower power factor affect adversely the efficiency of the motor drive, the motor and inverter being inefficiently utilized, a situation which is seriously worsened when the operation is performed at a high frequency.

The need for a leading power factor with the load lies in the need for natural commutation of the SCR's of the inverter. This problem has been explained in the following published articles:

"Utilization and Rating of Machine Commutated Inverter-Synchronous Motor Drive" by J. Rosa in IAS78-15A, pp. 453–457.

"A Self-Controlled Synchronous Motor Drive Using Terminal Voltage Sensing" by H. Le-Huy, A. Jakubowicz and P. Perret in IEEE 1986, pp. 562–569.

"System Design Method for a Load-Commutated Inverter-Synchronous Motor Drive" by Allan B. Plunkett and Fred O. Turnbull, Vol. IA-20, Trans. IEEE, May/June 1984.

Analysis of a Novel Forced-Commutation Starting Scheme for a Load-Commutated Synchronous Motor Drive" by R. L. Steigerwald and T. A. Lipo, IEEE Trans. Ind. Appl., Vol. 1A-15, pp. 14–24, January/February 1979.

While a leading load power factor ensures natural commutation in the quenching process and normally operates also during the thyristor recovery time, at high operative frequency the thyristor recovery time might prevent the total extinction of the outgoing static power switch in the inverter, if the margin angle δ is not large enough to exceed the value $2\pi f_m T_q$, where $f_m$ is the motor frequency and $T_q$ the thyristor recovery time. This is a particularly serious drawback with a variable speed AC motor drive.

An object of the present invention is to provide, in a load commutated inverter, assistance in the commutation of the outgoing SCR by generating an auxiliary voltage effective during the entire recovery phase.

This approach falls short of any forced-commutation arrangement of the prior art, since the leading power factor approach to natural commutation remains and is exercised during the quenching phase, thereby requiring only a limited and inexpensive solution to the commutation problem. In addition, while allowing a load commutated inverter to operate under a leading power factor, this is done without having to lower the power factor to the extent required when operating in the high frequency range, thereby preventing load utilization under a poor power factor.

SUMMARY OF THE INVENTION

In a load-commutated inverter system, the outgoing switch recovery time is extended by applying an auxiliary commutation voltage in series with the associated phase line in response to the gating of the incoming switch during a period initiated just before the expiration of the overlap time interval and for a duration extending by a predetermined amount beyond the normal recovery time of the outgoing switch.

The auxiliary commutation voltage has the proper magnitude, polarity and duration. It is generated, preferably, with a saturable transformer which, also preferably, is excited by the motor terminal voltage, the excitation being triggered by a zero crossing.

DETAILED DESCRIPTION OF THE INVENTION

Figure 1:
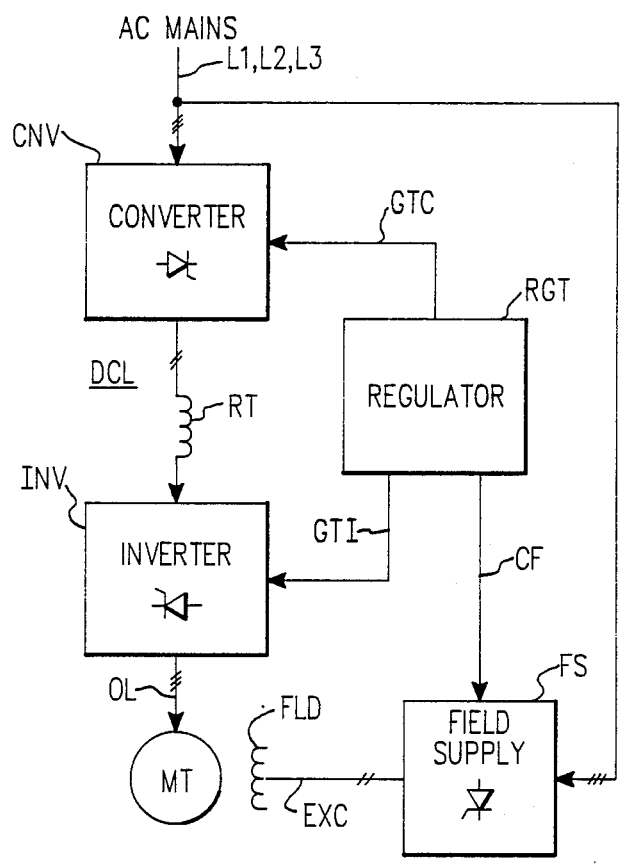
FIG. 1 is a block diagram of a load-commutated inverter motor drive.

The invention will be described in the context of a synchronous motor drive. FIG. 1 is a block diagram illustrating such a motor drive. From the mains (lines L1, L2, L3) and AC power supply is converted to DC by a converter CNV, and a load-commutated inverter INV responds to the interconnecting DC-link DCL, which include a reactor, and which may be either a voltage, or a current source. A regulator RGT controls by lines GTC the gating of the converter and by lines GTI the gating of the inverter. The motor is supplied with field excitation by a field supply circuit FS controlled, via lines CF, by the regulator. The motor terminals OL have three phases R, S, T.

The synchronous motor operates as a load providing the commutation of the inverter thyristors, provided motor control ensures a leading phase displacement angle for the inverter output current with respect to the load voltage on terminals OL. Running the motor with a leading current displacement angle results in a poorer power factor and entails a sacrifice in the efficiency, both with the motor and with the inverter utilization. This will become excessive if the drive operates at high frequency.

Figure 2:
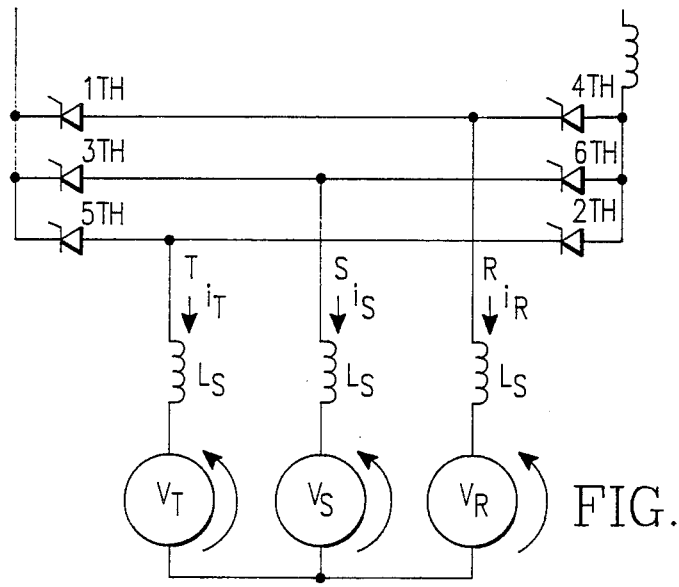
FIG. 2 shows, for each phase at the output of the inverter, the emf voltage sources generated by the motor.
Figure 3A:
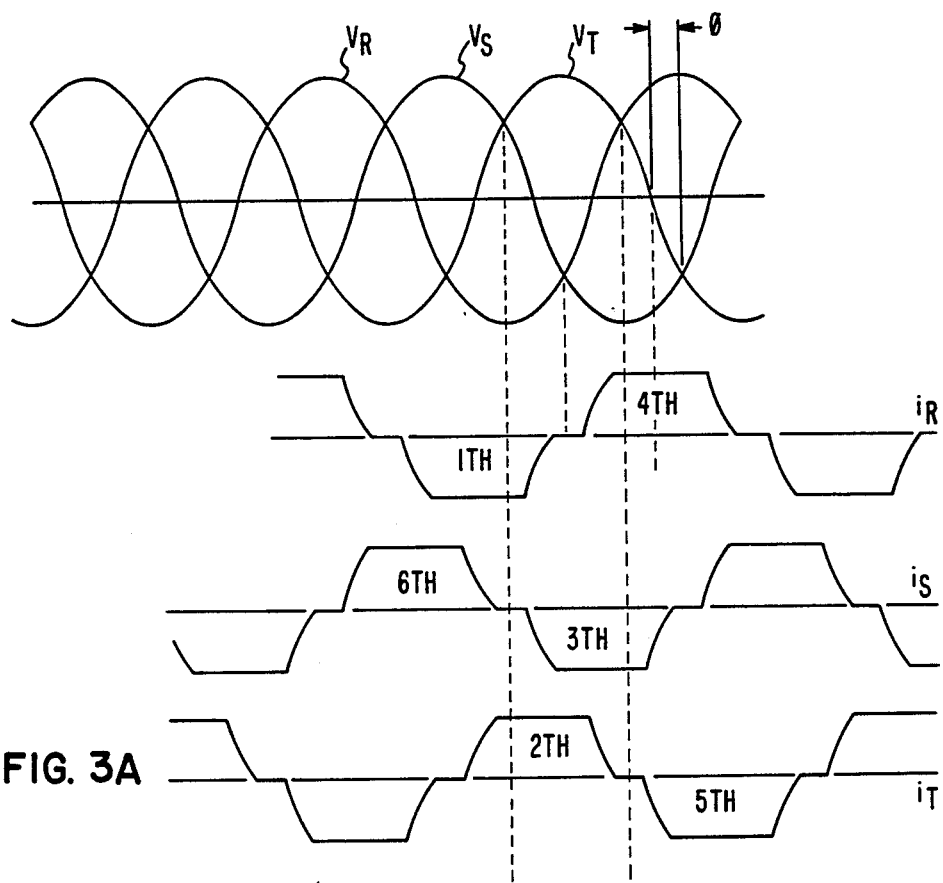
FIG. 3A illustrates with curves the motor voltages and currents.

Referring to FIG. 2, the motor M is shown reduced to its equivalent characteristics, namely an inductor LS and an emf voltage source ($V_R$, $V_S$, or $V_T$), one on each of the input lines R, S, T. FIG. 3A shows the voltages $V_R$, $V_S$ and $V_T$ and the currents $i_R$, $i_S$, $i_T$ as a function of time, assuming the pairs of thyristors (1TH, 4TH), (3TH, 6TH) and (5TH, 2TH) mounted in series across the DC link with nodal points connected to lines R, S, and T, respectively (as shown in FIG. 2), are being fired in numerical order 1TH-6TH.

Figure 3B:
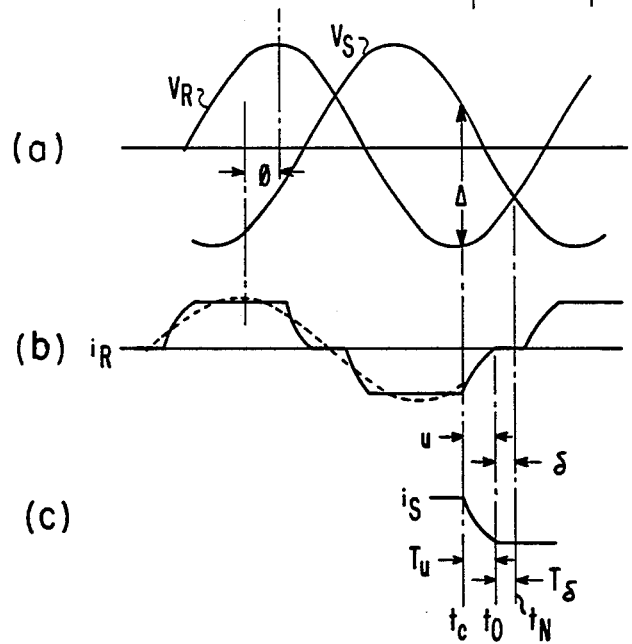
FIG. 3B illustrates with curves the commutation process between two successive phases in the sequence of firing.

Referring to FIG. 3B, it is assumed at a given instant that thyristors 1TH and 2TH are conducting (FIG. 3A), generating a current $i_R$ through 1TH leading voltage $V_R$, and generating a current $i_T$ through 2TH leading voltage $V_T$, when at instant $t_c$ regulator RGT (FIG. 1) causes, by triggering thyristor 3TH (FIG. 2) (by pulse line GT3), a commutation to occur causing on phase S a current $i_S$ to build up (under (c) in FIG. 3B). The mechanism of commutation has been described by J. Rosa in "Utilization and Rating of Machine Commutated Inverter-Synchronous Motor Drives", IEEE Trans. Ind. Appl., Vol. 1A-15, pp. 155-164, March/April 1979.

At instant $t_c$, current $i_R$ is negative and flows through valve 1TH. At the same instant, motor current $i_S$ is zero and motor current $i_T$ for phase T is positive and supplied by value 2TH. The commutation of the current from line R to line S is initiated by gating valve 3TH. Since current $i_R$ is leading by an angle $\phi$, at time $t_c$ voltage $v_S$ is more positive than voltage $v_R$ by a difference $\Delta$, resulting in the immediate conduction of 3TH, and current $i_S$ will start, assuming an increasing level of current. Simultaneously, the current in 1TH will correspondingly decrease and reach zero at time $t_O$. The interval ($T_u = t_o - t_c$) corresponds to the angle of conduction "overlap":u. The ratio of the time-varying difference $\Delta$ to the quantity $2L_s$ (where $L_s$ symbolizes the motor inductance per phase) governs the rate of variation of these currents. At the end of $T_u$, recovery of 1TH can start provided that voltage $v_S$ is still more positive than $v_R$, a condition that will be ensured only if $\phi$ is large enough.

During a following interval $T_\delta$, known as the "margin angle" $\delta$, the outgoing valve 1TH is reverse-biased by the still positive difference $\Delta = v_S - v_R$. At time $t_N$, this difference becomes zero ($v_R$ intersects $v_S$) and the reverse-biasing of 1TH ends. At this time, safe commutation requires that the outgoing valve be able to block forward voltage. The value of $T_\delta$ must, thus, exceed the thyristor recovery time. Commutation safety, therefore, mandates that the motor be run with a displacement angle $\phi$ sufficiently large to ensure the condition $$\delta > 3\pi f_m T_q$$

in which $f_m$ is the motor operating frequency and $T_q$ the thyristor recovery time. As a first approximation $\phi \sim \frac{1}{2}u + \delta$, so that the required value of $\phi$ can be considered as increasing linearily with the operating frequency.

From this it appears that LCI drives must be designed so as to run with a leading load power factor in order to ensure safe commutation. This results in a reduction in motor utilization and inverter capabilities. Would a unity load power factor be permissible, more shaft power would be available from the motor for a given frame size and more power could be delivered by the inverter for a given semiconductor device current and voltage rating.

The leading load power factor requirement in LCI drives has been hitherto accepted as a price to be paid for running the inverter without having to use forced-commutation circuits. However, the trend has been to bring the operating frequency range of an LCI drive to higher limits, for commercial reasons, at which level the leading power factor requirement becomes less acceptable. The power factor at high frequency inverter operation may impose unacceptable penalties. For a 120 Hz drive, for instance, the margin angle must be 40° when using standard 400 μs thyristors, whereas a margin angle of only 20° is acceptable at 60 Hz. It has been shown that this results in a loss of 30% of the motor available power and an increase by 26% of the thyristor stack stress when a 60 Hz motor drive is used at 120 Hz.

Except when faster thyristors can be used, at any rate an expensive choice, high frequency LCI drives are beyond the possibilities of present day semiconductor technology for high power applications.

Figure 3C:
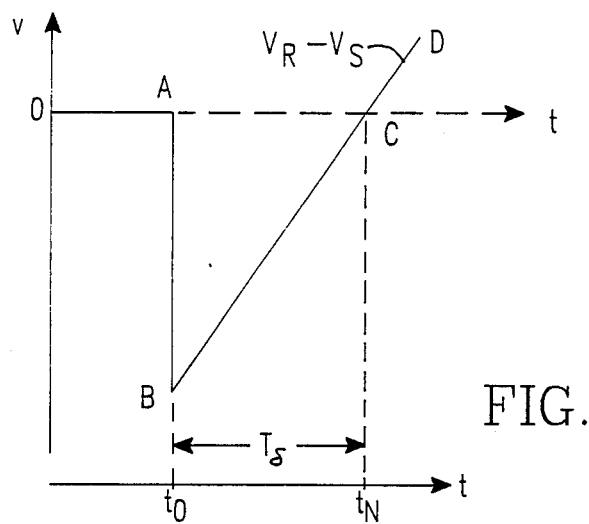
FIG. 3C is a curve showing as a function of time the reverse bias voltage applied to the outgoing static power switch in the sequence of firing the inverter.

Referring to FIG. 3C, the reverse bias voltage, applied to the outgoing value 1TH during the time interval $T_s$ of FIG. 3B, is shown following a straight line BCD representing ($V_R - V_S$). At time $t_o$, when valve 3TH is gated, the anode of value 1TH receives a negative voltage raising it from zero (at A) to B. Then, the anode voltage is reduced down to zero at C, and it will become positive again beyond instant $t_N$, following a trajectory from C to D.

According to the present invention, provision is made for the introduction into the commutation process of external means assisting the commutation only during the thyristor recovery phase (beyond instant $t_o$), not during the current quenching phase (overlap period μm). Therefore, the invention does not involve any forced-commutation arrangement, thereby avoiding high power circuits in the implementation. Another advantage resides in that the thyristor recovery time constraints no longer cause a worsening of the load power factor when the operative frequency is increased so as to meet LCI drive market demand.

Examining again FIG. 2, it is seen that the reverse bias voltage (applied to the outgoing valve 1TH during time interval $T_\delta$ as shown in FIG. 3C) is supplied by powerful motor emf sources $V_A$, $V_S$, $V_T$. Yet, it does not deliver any significant power during interval $T_\delta$, since the current through 1TH is zero. During the preceding interval $T_u$, the same strong sources were supplying the commutation energy necessary to extinguish the current in the outgoing motor line and building it up in the incoming line. In the process, the motor was functioning as a valuable source of commutation power. In contrast, during the $T_\delta$ interval, the motor sources do not supply power (except to the thyristor suppressor network, not shown). They merely provide a biasing function. Yet, in order to secure such biasing function, the prior art had to pay a price in terms of reduced power factor. It costs as much as for the better exploited commutation volt-seconds supplied by the motor during time interval $T_u$.

Figure 4:
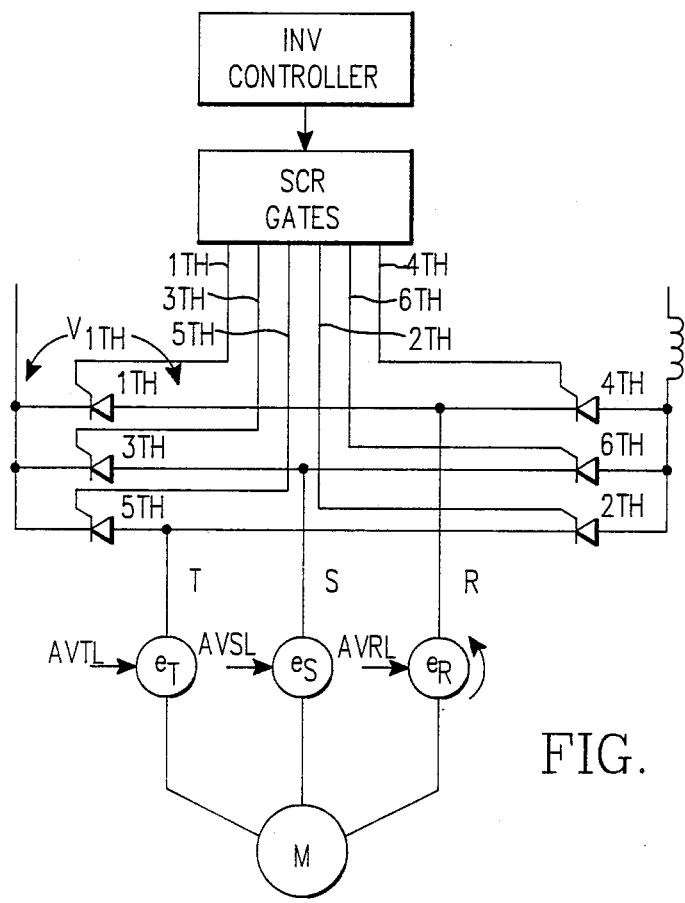
FIG. 4 is a block diagram, showing the adjunction to the motor terminals of commutation assisting voltages according to the present invention.

Referring to FIG. 4, it is now proposed to have recourse to three additional, and externally controlled "assisting" voltage sources of potential $e_R$, $e_S$, and $e_T$ placed in series in the motor lines R, S, T, respectively. The assisting voltage sources (AVR, AVS, AVT) are normally at zero voltage. As soon as the current in the particular motor line becomes zero as a result of the commutation process (instant $t_o$ in FIG. 3B), the voltage source AVR, AVS, or AVT is activated with a proper amplitude, polarity and time duration, so as to provide a potential $e_R$, $e_S$, or $e_T$. Since at that instant ($t_o$) the current ($i_R$, $i_S$, or $i_T$) is virtually zero, the power supplied by the voltage $e_R$, $e_S$ or $e_T$ will be very low, because it would only deliver energy to the thyristor suppression network. Accordingly, the motor emf voltages $V_R$, $V_S$, $V_T$ (FIG. 3) do not have to take any part in the reverse bias voltage supplying process occurring during that period. Therefore, angle $\delta$ and displacement angle $\phi$ can be reduced, with the benefit of an improved power factor and a better utilization of the drive.

Figure 4A:
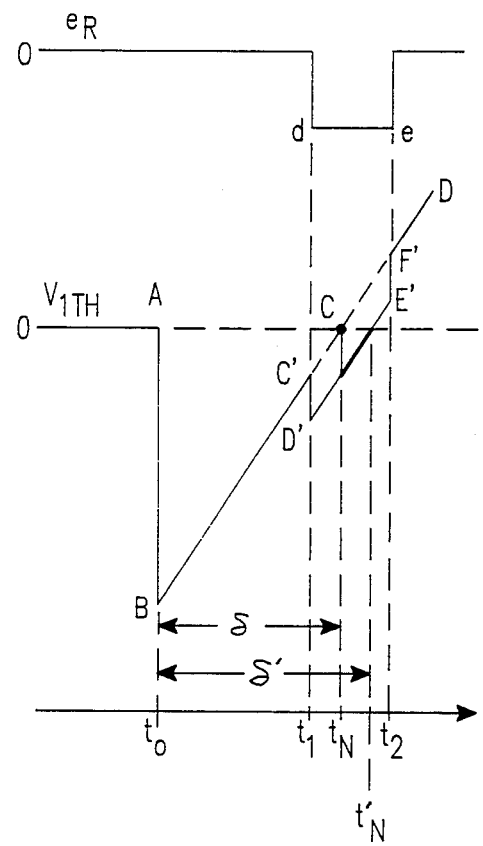
FIG. 4A shows with curves the effect on the margin angle of the presence of a commutation assisting voltage like in FIG. 4.

The curves of FIG. 4A show illustratively the assisting voltage $e_R$ as a negative square pulse for the sake of simplicity. The pulse is initially at a time $t_1$ occurring after the instant $t_0$ of zero current in valve 1TH, but before the occurrence of instant $t_N$ marking the end of the normal recovery phase. The shape of the applied valve bias voltage $v_{1TH}$ becomes modified by the assisting voltage in such a manner that at time $t_N$, when the reverse bias would normally become zero, there is still a net reverse bias that extends till $t'_N$. This allows extra recovery time for the outgoing valve, thus resulting in the extension of the margin angle from valve $\delta$ to valve $\delta'$ without worsening the power factor.

The bias voltage instead of following line BCD, as in FIG. 3C, follows (in FIG. 4A) a trajectory BC'D'E'F'G'D. In fact, the critical point C is now at E' between D' and F'. At F' the applied "assisting" voltage ($e_R$ in FIG. 4A assuming 1TH is the outgoing thyristor) is cancelled, and the characteristic is again along line CD. It is observed that, depending upon which thyristor in the sequence 1TH and 6TH is outgoing, the polarity of the assisting voltage may be different. The following table is indicative of such polarity alternance for the successive outgoing thyristors:

TABLE

|  | 1TH | 2TH | 3TH | 4TH | 5TH | 6TH |
|---|---|---|---|---|---|---|
| $+e_R$ | X | | | | | |
| $+e_S$ | | | X | | | |
| $+e_T$ | | | | | X | |
| $-e_R$ | | | | X | | |
| $-e_S$ | | | | | | X |
| $-e_T$ | | X | | | | |

Referring to FIG. 4, upon each gating (instant $t_o$) of a new thyristor in the sequence (3TH in the example) an "assisting voltage" (AVR with voltage ($-e_R$) in the example of FIG. 4A) is activated for a duration ($t_1-t_2$) at an instant $t_1$ following instant $t_o$ and before the duration of a full time interval $\delta$, namely, the margin angle for the particular thyristor (1TH in the example). Lines AVRL, AVSL and AVTL are shown for activation of the respective "assisting" voltage sources (AVR, AVS, AVT) for the respective phases (R, S, T).

Figure 4C:
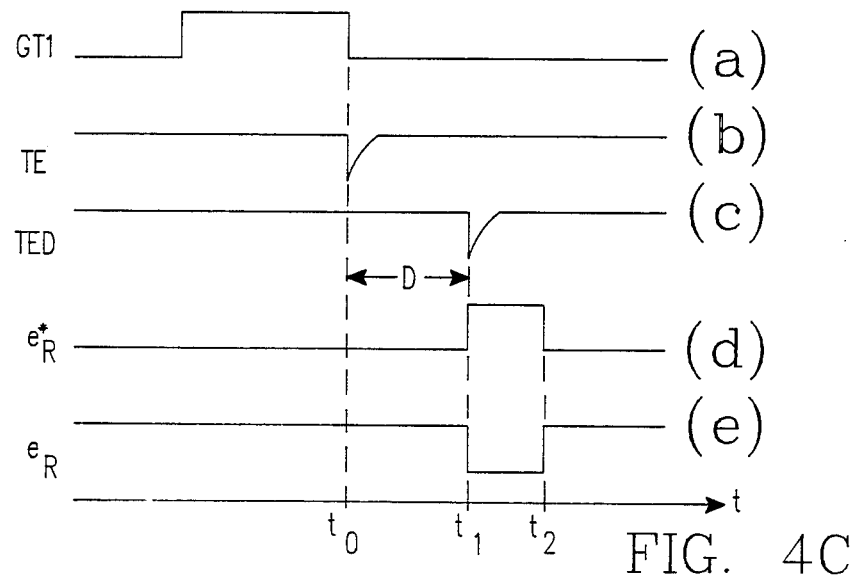
FIG. 4C illustrates with curves the operation of the circuit of FIG. 4B.
Figure 4B:
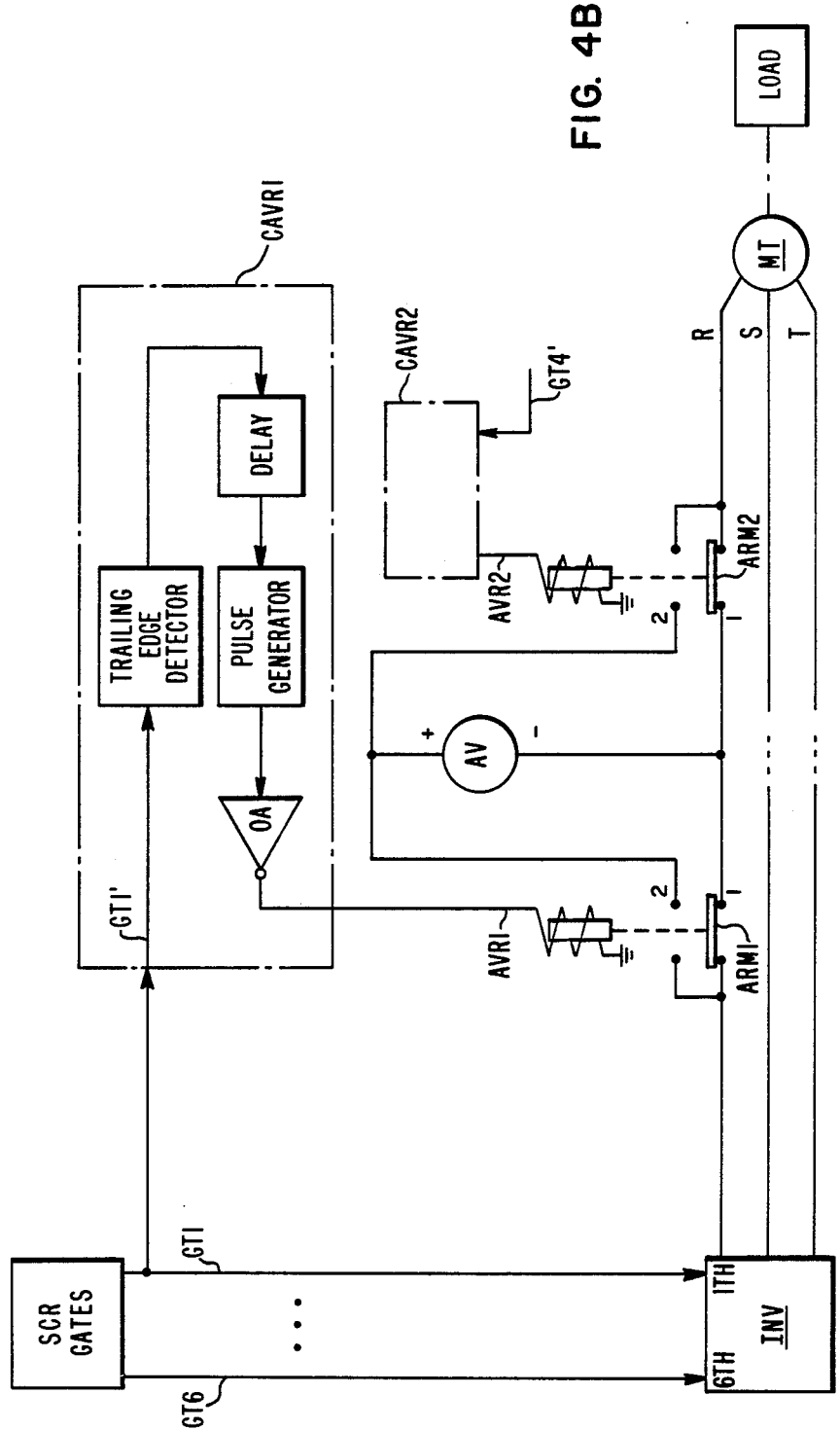
FIG. 4B is a block diagram showing the generation of a signal controlling the buildup as a function of time of a commutation-assisting voltage as shown in FIG. 4A.

Referring to FIG. 4B, a block diagram is shown illustrating, for phase R, control of the assisting source for two opposite polarities one when 1TH goes out ($-e_R$), the other when 4TH goes out ($+e_R$). The voltage $e_R$ is given by a source of potential AV which can be inserted in line R with either polarity by an interrupter (mobile arm ARM1 for the positive potential, ARM2 for the negative potential) having a position #1 when the source is not inserted, a portion #2 when it is. A relay in each case brings the corresponding arm (ARM1, ARM2) into position #2 when the "assisting" source is needed. When, and how long, the source is inserted depends upon the trailing edge (instant $t_o$) of the pulse firing the outgoing thyristor for conduction, and upon a delay defining the instant $t_1$ of activation, and a further delay defining ($t_1-t_2$), i.e., the duration of activation.

Referring to FIG. 4C, the pulse GT1 is shown at (a) as applied for gating thyristor 1TH, with its trailing edge detected as shown in (b). The delay D (at (c)) shows the delayed occurrence of instant $t_1$, and there is also shown at (d) a concurrent front end of a pulse ($e_R$) (generated after the time interval D) in the form of a pulse of duration ($t_1-t_2$) converted (at (e)) into an active pulse representing the "assisting" voltage source.

The signals of FIG. 4C translate the operation of the "assisting" voltage control circuit CAVR1 for the AVR source associated with the commutation of the outgoing thyristor 1TH. The gating pulse GT1 which goes to the inverter (one of GT1-GT6 for thyristors 1TH-6TH) is applied by GT1' onto a trailing edge detector DCT which provides a detected pulse TE applied to a delay DE outputting a delayed pulse TED (delay DE), by which a pulse generator PG is triggered to output a pulse of duration ($t_1-t_2$) shown as $e_R$. The latter signal is scaled and shaped as a control signal AVR1 to control a relay placing arm ARM1 from position #1 into position #2, thereby inserting the voltage $+e_R$ (from source AV) in series with phase line R, with the effect shown in FIG. 4A. It is understood from FIG. 4B that, when thyristor 4TH is outgoing, the signal GT4 to the inverter will operate by GT4' in the same way for assisting source controller CAVR2 which controls arm ARM2, so as to insert $-e_R$ (rather than $+e_R$) in this case. The magnitude of $e_R$, $e_S$, $e_T$, and the duration ($t_1-t_2$) depend upon the characteristics of the thyristor.

Figure 5:
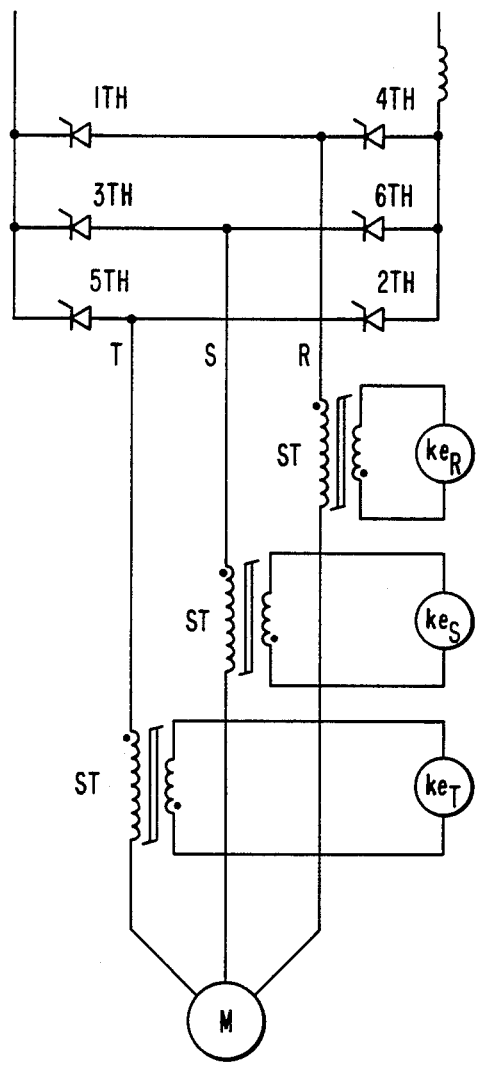
FIG. 5 is a block diagram showing the implementation of commutation-assisting voltages in triangular form and with saturable transformers.
Figure 5A:
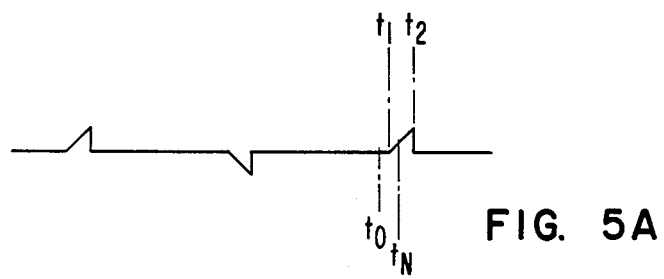
FIG. 5A is a curve illustrating the "assisting" voltages in time succession as generated.

Referring to FIG. 5, a practical implementation is illustrated by using saturable transformers ST coupled on the respective phase lines (R, S, T) with a source ($ke_R$, $ke_S$, $ke_T$) on the primary thereof generated as a triangular voltage during time interval ($t_1-t_2$), as shown by the curve of FIG. 5A. The use of polarity alternance on each phase line takes care of the polarity requirement on successive outgoing thyristors.

FIG. 5A shows how a triangular assisting pulse affects the margin angle beyond the zero crossing point C, as opposed to FIG. 4A.

By designing the cores of transformers ST so that they saturate at a small fraction of the motor line current, their size can be kept small and the result of suppressing any effect from the assisting sources during normal conduction is accomplished. As the secondary current becomes zero in a given transformer, pulse excitation with a proper polarity at the primary can produce the required assisting reverse bias voltage across the secondary. Pulse sources are provided to drive the primaries at the proper instants so as to accomplish the desired commutation assistance effect. The power required from such primary pulse sources is minimal due to the low secondary current levels required. The turn ratio k is selected so that the primary pulse voltage can be conveniently small. Various primary pulse shapes are possible, but the triangular shape, as shown, results in minimum transformer volt-second requirements. The triangular pulse is initiated at $t_1$, after instant $t_0$ of zero current occurrence in the valve which is being assisted, but it ends just a short time before instant $t_N$, the instant at which natural (unassisted) reverse bias ends. The slope of the triangular pulse at the secondary of transferring ST is equal in value, and opposite in sign, compared to the slope of the unassisted reverse bias voltage. The instant of termination $t_2$ for the triangular pulse depends upon how much the natural margin angle is to be extended, considering that the size of the transformers is directly affected by the volt-second integral of the driving triangular pulse.

Figure 6:
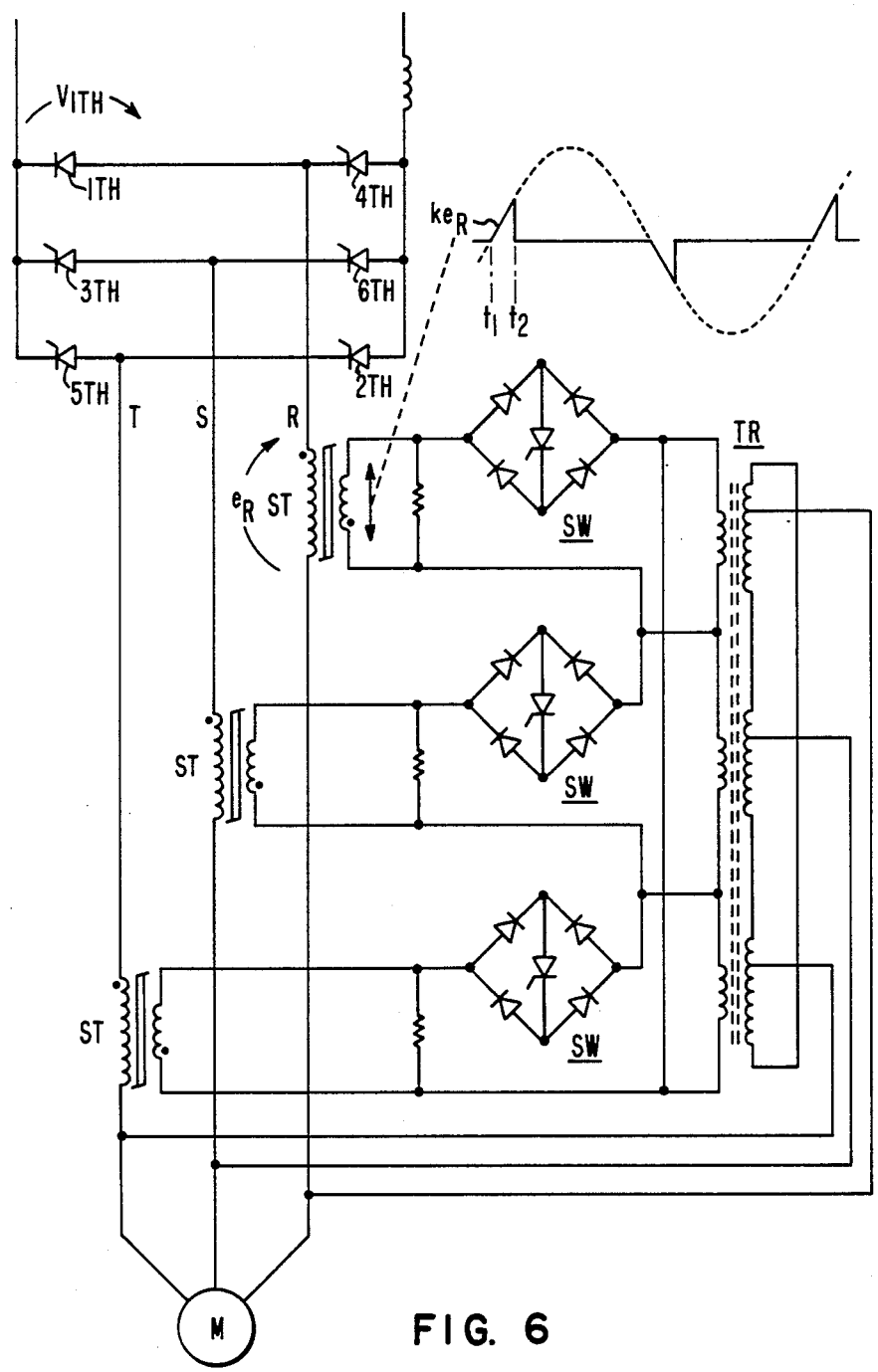
FIG. 6 is an implementation of the circuit of FIG. 5 using the motor voltages as a source of "assisting" pulses.

FIG. 6 shows an implementation of the primary pulse drive for the ST transformers of FIG. 5 in which the motor voltages are used to provide both power and wave shaping of the assisting sources. Low rating transformer TR combines the motor emf voltages, slightly adjusts their phase via taps at the primary and delivers them properly scaled in to a system of three controlled turn-off AC switches SW of moderate rating. Each switch (typically, a GTO thyristor is shown in the diagonal of a full wave diode bridge providing bidirectionality) is controlled by conventional logic in response to the conduction state of the valves to be turned ON at an instant $t_1$ shortly before the predicted instant $t_N$, and to be turned OFF at an instant $t_2$, the interval $(t_2-t_1)$ providing a fixed ON period. The phase of the sinusoid at the secondary of transformer TR, is determined by taps on the primary and is such that $t_1$ coincides with the zero-crossing. In this manner, the signals applied to the primaries of the ST transformers follow initially the voltage curve from its zero crossing and are nearly triangular while taking automatically the proper polarity and amplitude so as to assist each outgoing valve in providing varying motor speed and voltage conditions.

Figure 6A:
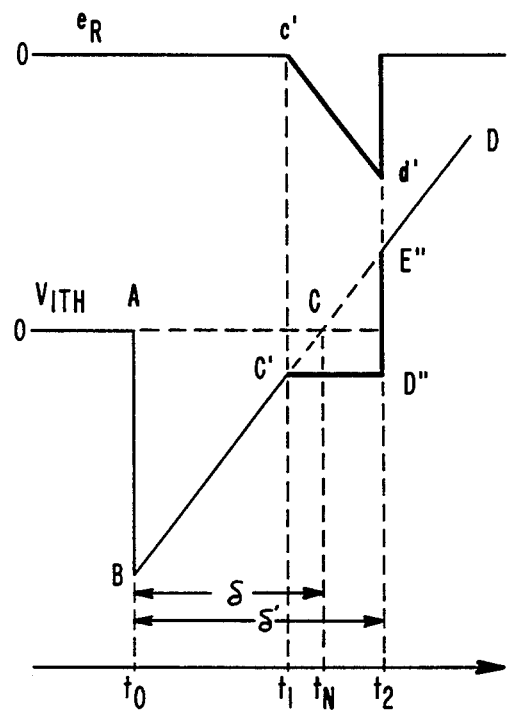
FIG. 6A illustrates with a curve the derivation of an approximatively triangular assisting voltage.

FIG. 6A illustrates with a curve the generation of quasi-triangular voltages matching the fundamental voltage and delineated upon the zero-crossing points of the motor voltages.

I claim:

1. In a load commutated inverter system including a plurality of static power switches of the inverter controlled for supplying on respective phases, to a load and via load terminals, AC voltages and currents with a leading power factor, said power switches being controlled in a firing sequence in accordance with a predetermined phase order, the combination of:
   means for controlling for conduction an incoming switch in said sequence during an overlap time interval allowing an outgoing switch in said sequence to be oppositely biased under the line-to-line voltage existing between the phase terminals of said incoming and outgoing switches; and
   means responsive to said controlling means for applying to said outgoing switch an additional bias voltage during another time interval adjoining and extending beyond said overlap time interval, thereby to establish a time recovery period for said outgoing switch which is coextensive with said another time interval.

2. The system of claim 1, with said controlling means generating a control pulse having a front edge applied to the incoming switch for initiating the conduction thereof, and having a trailing edge for triggering the extinction thereof; and
   with said additional bias voltage applying means being responsive to said trailing edge for initiating said another time interval after a predetermined delay following the occurrence of such trailing edge.

3. The system of claim 2, with said another time interval initiating means including timing means operative before the expiration of said overlap time interval, and lasting at least till the end of said recovery period, thereby to establish said another time interval between such two occurrences.

4. The system of claim 3, with an auxiliary voltage source being operatively connected in series in the phase line associated with the outgoing switch between said two occurrences.

5. The system of claim 4, with said auxiliary source having a constant selected voltage.

6. The system of claim 4, with said auxiliary source having a linear decreasing voltage from a selected magnitude to zero between said two occurrences.

7. The system of claim 6, with one such said auxiliary source being associated with each of said phase lines.

8. The system of claim 7, with each of said auxiliary sources being coupled to the associated phase line through an auxiliary transformer.

9. The system of claim 8, with such auxiliary transformer being a saturable transformer.

10. The system of claim 9, with each of said auxiliary sources being activated in succession like the sequence of said phase lines, and being operated for alternate polarities in relation to the polarity of the current in the outgoing power switch in the firing sequence of said power switches.

11. The system of claim 10, with said auxiliary sources being excited in response to the voltage on the corresponding phase line and in relation thereto.

12. The system of claim 11, with auxiliary power switches being operatively connected between corresponding phase lines and corresponding inputs on the respective auxiliary transformers, said auxiliary switches being controlled for conduction to apply the corresponding phase line voltage as such auxiliary voltage between said two occurrences.

13. The system of claim 12, with the first occurrence coinciding with a zero-crossing of the line voltage.

* * * * *